United States Patent
Burd

(10) Patent No.: US 11,933,218 B2
(45) Date of Patent: Mar. 19, 2024

(54) SYSTEM WITH MULTIPLE FORCED INDUCTION ENGINES

(71) Applicant: Raytheon Technologies Corporation, Farmington, CT (US)

(72) Inventor: Steven W. Burd, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/091,867

(22) Filed: Dec. 30, 2022

(65) Prior Publication Data

US 2024/0026818 A1 Jan. 25, 2024

Related U.S. Application Data

(60) Provisional application No. 63/391,489, filed on Jul. 22, 2022.

(51) Int. Cl.
| | |
|---|---|
| *F02C 6/12* | (2006.01) |
| *F02B 37/00* | (2006.01) |
| *F02C 7/36* | (2006.01) |
| *F02K 5/02* | (2006.01) |

(52) U.S. Cl.
CPC ............... *F02C 6/12* (2013.01); *F02B 37/00* (2013.01); *F02C 7/36* (2013.01); *F02K 5/02* (2013.01); *F05D 2220/40* (2013.01); *F05D 2220/74* (2013.01)

(58) Field of Classification Search
CPC .... F02B 37/00; F02C 6/02; F02C 6/12; F02K 5/02
See application file for complete search history.

(56) References Cited

U.S. PATENT DOCUMENTS

| | | | |
|---|---|---|---|
| 2,465,099 | A | 3/1949 | John |
| 4,815,282 | A | 3/1989 | Wilkinson |
| 11,015,523 | B2 | 5/2021 | Terwilliger |
| 2013/0213048 | A1 | 8/2013 | Stücki |
| 2019/0040794 | A1 | 2/2019 | Bolduc |
| 2021/0246827 | A1 | 8/2021 | Lafarque |

OTHER PUBLICATIONS

EP Search Report for EP Patent Application No. 23187296.1 dated Dec. 4, 2023.

*Primary Examiner* — Ngoc T Nguyen
(74) *Attorney, Agent, or Firm* — Getz Balich LLC

(57) ABSTRACT

A system is provided that includes a compressor section, a turbine section, a first engine and a second engine. The compressor section includes a compressor rotor. The turbine section includes a turbine rotor configured to drive rotation of the compressor rotor. The first engine includes a first engine inlet, a first engine outlet and a first engine combustion zone fluidly coupled with and between the first engine inlet and the first engine outlet. The first engine inlet is fluidly coupled with and downstream of the compressor section. The first engine outlet is fluidly coupled with and upstream of the turbine section. The second engine includes a second engine inlet, a second engine outlet and a second engine combustion zone fluidly coupled with and between the second engine inlet and the second engine outlet. The second engine inlet is fluidly coupled with and downstream of the compressor section.

20 Claims, 9 Drawing Sheets

SYSTEM WITH MULTIPLE FORCED INDUCTION ENGINES

This application claims priority to U.S. Patent Appln. No. 63/391,489 filed Jul. 22, 2022, which is hereby incorporated herein by reference in its entirety.

BACKGROUND OF THE DISCLOSURE

1. Technical Field

This disclosure relates generally to an aircraft and, more particularly, to a powerplant for powering components of the aircraft.

2. Background Information

An aircraft includes a powerplant for powering one or more aircraft components. Various aircraft powerplant types and configurations are known in the art. While these known aircraft powerplants have various advantages, there is still room in the art for improvement. There is a need in the art, in particular, for an aircraft powerplant with improved efficiency and/or a reduced size.

SUMMARY OF THE DISCLOSURE

According to an aspect of the present disclosure, a system is provided that includes a compressor section, a turbine section, a first engine and a second engine. The compressor section includes a compressor rotor. The turbine section includes a turbine rotor configured to drive rotation of the compressor rotor. The first engine includes a first engine inlet, a first engine outlet and a first engine combustion zone fluidly coupled with and between the first engine inlet and the first engine outlet. The first engine inlet is fluidly coupled with and downstream of the compressor section. The first engine outlet is fluidly coupled with and upstream of the turbine section. The second engine includes a second engine inlet, a second engine outlet and a second engine combustion zone fluidly coupled with and between the second engine inlet and the second engine outlet. The second engine inlet is fluidly coupled with and downstream of the compressor section.

According to another aspect of the present disclosure, another system is provided that includes a compressor section, a turbine section, a first engine and a second engine. The compressor section includes a compressor rotor. The turbine section includes a turbine rotor configured to drive rotation of the compressor rotor. The first engine includes a first engine inlet, a first engine outlet and a first engine combustion zone fluidly coupled with and between the first engine inlet and the first engine outlet. The first engine inlet is fluidly coupled with and downstream of the compressor section. The first engine outlet is fluidly coupled with and upstream of the turbine section. The second engine includes a second engine inlet, a second engine outlet and a second engine combustion zone fluidly coupled with and between the second engine inlet and the second engine outlet. The second engine outlet is fluidly coupled with and upstream of the turbine section.

According to still another aspect of the present disclosure, another system is provided that includes a turbocharger, a first engine and a second engine. The turbocharger includes a compressor section and a turbine section. The first engine is configured to receive first engine compressed air from the compressor section, combust first engine fuel with the first engine compressed air to generated first engine combustion products, and direct the first engine combustion products to the turbine section to drive rotation of a rotor within the turbine section. The second engine is configured to receive second engine compressed air from the compressor section, combust second engine fuel with the second engine compressed air to generated second engine combustion products, and direct the second engine combustion products to the turbine section to further drive rotation of the rotor within the turbine section.

The system may be an aircraft system.

The system may also include a mechanical load. The first engine and/or the second engine may be configured to drive rotation of a rotor of the mechanical load.

The compressor section may be fluidly coupled with the first engine inlet and the second engine inlet in parallel.

The turbine section may be fluidly coupled with the first engine outlet and the second engine outlet in parallel.

The system may also include a turbine expander section. An inlet to the turbine expander section may be fluidly coupled with and downstream of an outlet from the turbine section.

The system may also include a mechanical load rotatably driven by a rotor of the turbine expander section.

The system may also include a geartrain. A rotor of the turbine expander section may be coupled to the turbine rotor through the geartrain.

The system may also include a geartrain. A rotor of the turbine expander section may be coupled to a first engine rotating structure of the first engine through the geartrain. The rotor of the turbine expander section may also be coupled to a second engine rotating structure of the second engine through the geartrain.

The second engine outlet may be fluidly coupled with and upstream of the turbine section.

The second engine outlet may be fluidly discrete from the turbine section.

The system may also include a plenum fluidly coupled with and between the compressor section and the first engine inlet.

The system may also include a plenum fluidly coupled with and between the first engine outlet and the turbine section.

The system may also include a heat exchanger fluidly coupled with and between the compressor section and the first engine inlet.

The first engine may be configured as or otherwise include an intermittent combustion engine.

The second engine may be configured as or otherwise include an intermittent combustion engine.

The first engine may be configured as or otherwise include a continuous combustion engine.

The second engine may be configured as or otherwise include a continuous combustion engine.

The system may also include a mechanical load. A rotating structure of the first engine may be configured to drive rotation of the mechanical load.

The system may also include a propulsor rotor and a powerplant. The powerplant may be configured to drive rotation of the propulsor rotor. The powerplant include the compressor section, the turbine section, the first engine and the second engine.

The system may also include an electric generator and a powerplant. The powerplant may be configured to drive rotation of a rotor of the electric generator. The powerplant may include the compressor section, the turbine section, the first engine and the second engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
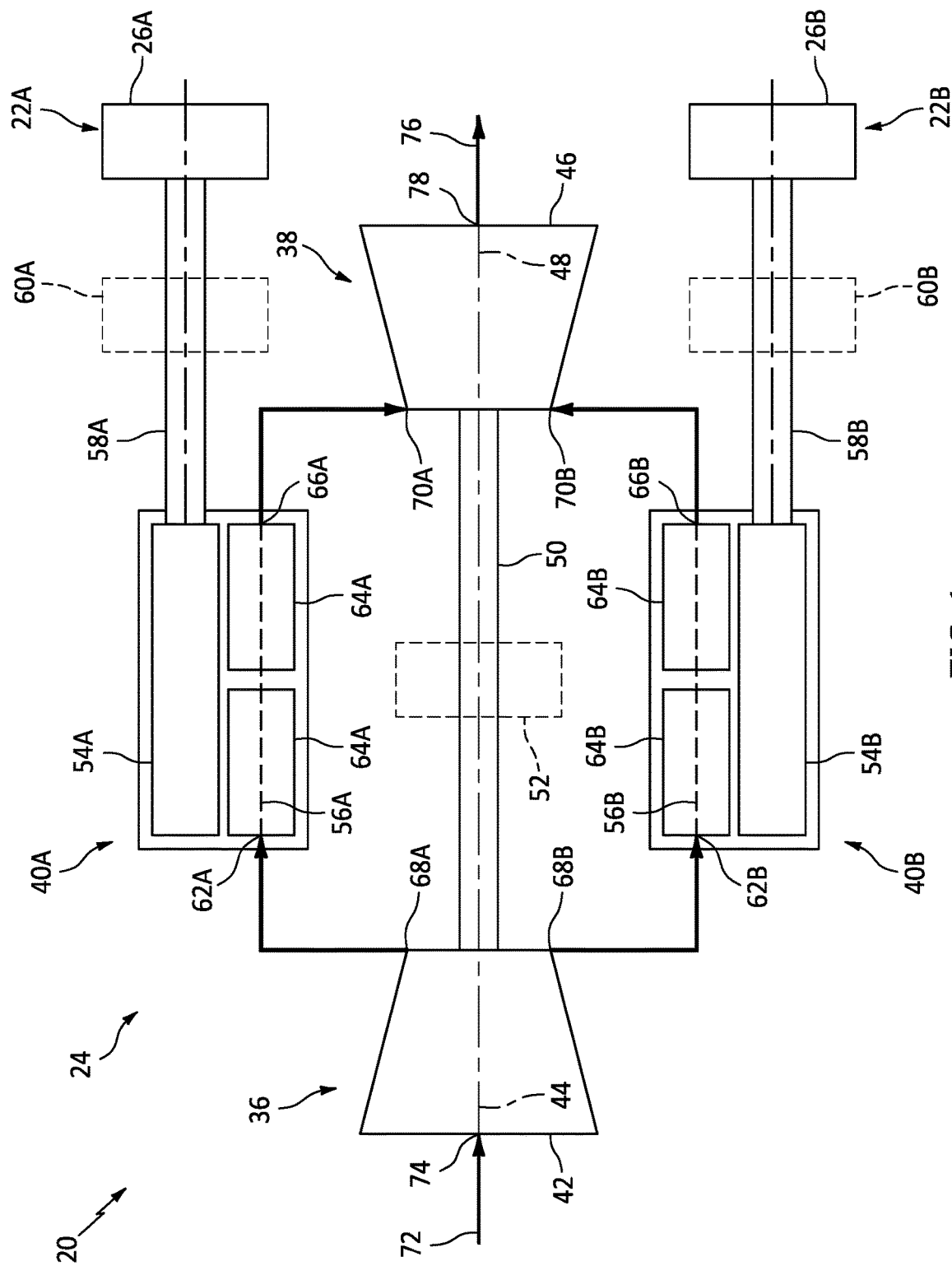
FIG. 1 is a schematic illustration of an aircraft system with multiple forced induction engines, where each engine powers a discrete mechanical load.

FIG. 1 illustrates a system 20 for an aircraft. This aircraft may be an airplane, a helicopter, a drone (e.g., an unmanned aerial vehicle (UAV)), a spacecraft or any other manned or unmanned aerial vehicle. The aircraft system 20 of FIG. 1 includes one or more mechanical loads 22 (e.g., 22A and 22B) and an aircraft powerplant 24 for mechanically powering the one or more mechanical loads 22.

Figure 2C:
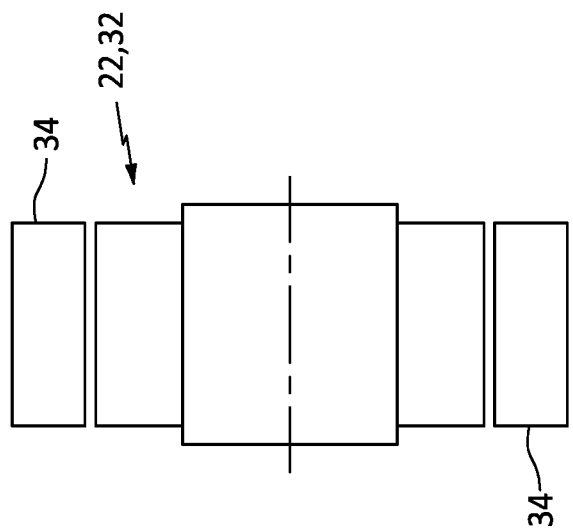
FIGS. 2A-C are schematic illustrations of various rotors for a mechanical load.
Figure 2B:
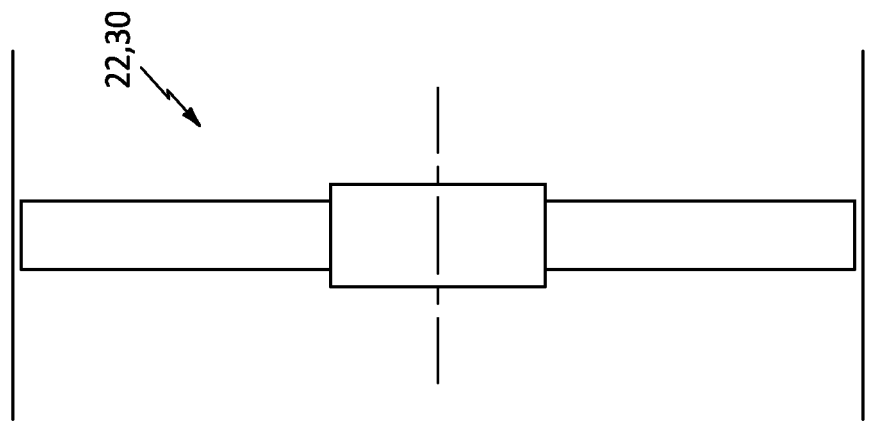
Figure 2A:
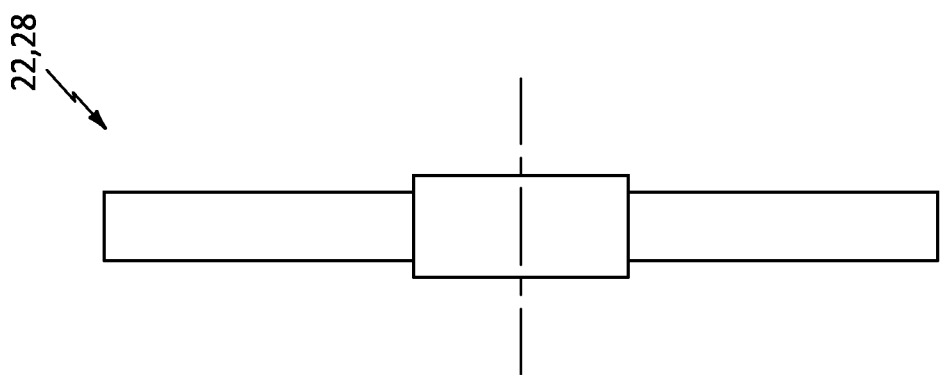

Each of the mechanical loads 22 may be configured as an aircraft propulsor (e.g., see FIGS. 2A and 2B) or an electric machine (e.g., see FIG. 2C). Each of the mechanical loads 22A, 22B includes a driven rotor 26 (e.g., 26A, 26B). This driven rotor 26, referring to FIGS. 2A and 2B, may be configured as a bladed propulsor rotor where the respective mechanical load 22 is configured as the aircraft propulsor. The driven rotor 26, for example, may include a plurality of propulsor rotor blades arranged circumferentially around and connected to a propulsor rotor base; e.g., a rotor hub or a rotor disk. Referring to FIG. 2A, the propulsor rotor may be configured as or otherwise include an open propulsor rotor 28 such as, but not limited to, a propeller or a helicopter rotor (e.g., a main rotor). Referring to FIG. 2B, the propulsor rotor may alternatively be configured as or otherwise include a ducted propulsor rotor 30 such as, but not limited to, a fan rotor. Referring to FIG. 2C, the driven rotor 26 may alternatively be configured as an electrical rotor 32 where the respective mechanical load 22 is configured as the electric machine. The driven rotor 26, for example, may include one or more electric windings wrapped around a rotor base. These electric windings may interact with (e.g., via an electromagnetic field) an electric stator 34 (e.g., circumscribing the electric rotor 32) of the electric machine to generate electricity for electrically powering one or more aircraft components inside and/or outside of the aircraft system 20. The electric machine may thereby operate as an electric generator. It is also contemplated the electric machine may alternatively be operated as an electric motor such that the driven rotor 26 becomes a driver rotor. The present disclosure, however, is not limited to the foregoing exemplary mechanical load configurations.

The aircraft powerplant 24 of FIG. 1 includes a compressor section 36 and a turbine section 38, where the compressor section 36 and the turbine section 38 may be arranged together as a turbocharger. The aircraft powerplant 24 of FIG. 1 also includes a plurality of discrete internal combustion (IC) engines 40 (e.g., 40A and 40B), where one or more or all of the internal combustion engines 40 may be boosted by the compressor section 36/the turbocharger.

The compressor section 36 may be configured as or otherwise include an axial flow compressor and/or a centrifugal flow compressor. This compressor section 36 may be configured as or otherwise include a single stage compressor or a multi-stage compressor. The compressor section 36 includes a bladed compressor rotor 42 rotatable about a compressor axis 44. This compressor rotor 42 includes a plurality of compressor blades arranged circumferentially around and connected to one or more rotor bases; e.g., rotor hub(s) or rotor disk(s). The turbine section 38 may be configured as or otherwise include an axial flow turbine and/or a centrifugal flow turbine. This turbine section 38 may be configured as or otherwise include a single stage turbine or a multi-stage turbine. The turbine section 38 includes a bladed turbine rotor 46 rotatable about a turbine axis 48, which turbine axis 48 may be parallel with (e.g., coaxial with) the compressor axis 44. This turbine rotor 46 includes a plurality of turbine blades arranged circumferentially around and connected to one or more rotor bases; e.g., rotor hub(s) or rotor disk(s). The turbine rotor 46 is coupled to and is configured to drive rotation of the compressor rotor 42. The coupling between the turbine rotor 46 and the compressor rotor 42 may be a direct drive connection (e.g., via a shaft 50) such that the turbine rotor 46 and the compressor rotor 42 may rotate at a common (the same) speed. It is also contemplated the coupling between the turbine rotor 46 and the compressor rotor 42 may be a geared connection (e.g., via a gearbox 52) such that the turbine rotor 46 and the compressor rotor 42 may rotate at different speeds.

Each of the internal combustion engines 40 may be configured as an intermittent combustion engine or a continuous combustion engine. The term "intermittent combustion engine" may describe an internal combustion engine in which a mixture of fuel and air is intermittently (e.g., periodically) combusted within the engine. Examples of the intermittent combustion engine include, but are not limited to, a reciprocating piston engine (e.g., an inline (I) engine, a V-engine, a W-engine, etc.) and a rotary engine (e.g., a Wankel engine). The term "continuous combustion engine" may describe an internal combustion engine in which a mixture of fuel and air is continuously (e.g., steadily) combusted within the engine. An example of the continuous combustion engine is a gas turbine engine.

Each of the internal combustion engines 40A, 40B of FIG. 1 includes an internal engine rotating structure 54 (e.g., 54A, 54B) and an internal engine flowpath 56 (e.g., 56A, 56B). The rotating structure 54 may include one or more pistons coupled to a crankshaft where the respective internal combustion engine 40 is configured as a reciprocating piston engine. The rotating structure 54 may include an (e.g., triangular) engine rotor (e.g., eccentrically) coupled to a driveshaft where the respective internal combustion engine 40 is configured as a rotary engine. The rotating structure 54 may be configured as an engine spool with a compressor rotor and a turbine rotor where the respective internal combustion engine 40 is configured as a gas turbine engine.

The present disclosure, however, is not limited to the foregoing exemplary rotating structure configurations.

Each rotating structure 54A, 54B of FIG. 1 is coupled to a respective one of the driven rotors 26A, 26B. The coupling between the rotating structure 54A, 54B and the driven rotor 26A, 26B may be a direct drive connection (e.g., via a shaft 58 (e.g., 58A, 58B)) such that the rotating structure 54A, 54B and the driven rotor 26A, 26B may rotate at a common (the same) speed. It is also contemplated the coupling between the rotating structure 54A, 54B and the driven rotor 26A, 26B may be a geared connection (e.g., via a gearbox 60 (e.g., 60A, 60B)) such that the rotating structure 54A, 54B and the driven rotor 26A, 26B may rotate at different speeds.

Each engine flowpath 56A, 56B extends from an inlet 62 (e.g., 62A, 62B) into the respective internal combustion engine 40A, 40B, serially or in parallel through one or more combustion zones 64 (e.g., 64A, 64B) (e.g., cylinder chamber(s), combustor(s), etc.) within the respective internal combustion engine 40A, 40B, to an outlet 66 (e.g., 66A, 66B) from the respective internal combustion engine 40A, 40B. Each engine inlet 62A, 62B of FIG. 1 is fluidly coupled with and downstream of an outlet 68 (e.g., 68A, 68B) from the compressor section 36; of course, the engine inlets 62 may alternatively be coupled to a common outlet 68 via a manifold for example. Each engine outlet 66A, 66B of FIG. 1 is fluidly coupled with and upstream of an inlet 70 (e.g., 70A, 70B) to the turbine section 38; of course, the engine outlets 66 may alternatively be coupled to a common inlet 70 via a manifold for example. With this arrangement, the internal combustion engines 40 and their engine flowpaths 56 are fluidly coupled with and between the compressor section 36 and the turbine section 38. The internal combustion engines 40 and their engine flowpaths 56 of FIG. 1 may also be arranged in parallel with and between the compressor section 36 and the turbine section 38.

During aircraft system operation, (e.g., fresh, ambient) air enters the aircraft powerplant 24 through an airflow inlet 72. This airflow inlet 72 may be an inlet 74 to the compressor section 36 (e.g., an inlet to the turbocharger), or alternatively an inlet upstream of the compressor section inlet 74. The incoming air is compressed within the compressor section 36 by the compressor rotor 42. The compressed air is directed into each engine flowpath 56. At (e.g., within and/or slightly upstream of) the combustion zone(s) 64 within the respective internal combustion engine 40, fuel (e.g., gasoline, diesel, jet fuel, etc.) is mixed with the compressed air to provide an air-fuel mixture. This air-fuel mixture is combusted within the combustion zone(s) 64 generating combustion products. The generation of the combustion products within the combustion zone(s) 64 and/or flow of the combustion products through the engine flowpath 56 drive rotation of the respective rotating structure 54. The combustion products are subsequently exhausted form the respective internal combustion engine 40 and directed through the turbine section 38, where flow of the combustion products through the turbine section 38 drive rotation of the turbine rotor 46. The combustion products may then be exhausted from the aircraft powerplant 24 through an exhaust 76. This exhaust 76 may be an outlet 78 from the turbine section 38 (e.g., an outlet to the turbocharger), or alternatively an outlet downstream of the turbine section outlet 78.

The rotation of the turbine rotor 46 drives rotation of the compressor rotor 42 and, thus, compression of the incoming air. The rotation of the rotating structures 54 respectively drive rotation of the driven rotors 26. The rotation of one or each driven rotor 26 may produce aircraft thrust where, for example, the respective driven rotor 26 is configured as the propulsor rotor (e.g., see FIGS. 2A and 2B). The rotation of one or each driven rotor 26 may alternatively generate electricity where, for example, the respective driven rotor 26 is configured as the electrical rotor 32 (e.g., see FIG. 2C). With this arrangement, the powerplant 24 may include different internal combustion engines 40 for discretely powering the mechanical loads 22. Such an arrangement may also provide redundancy where, for example, each mechanical load 22 is an aircraft propulsor or an electric machine. In addition or alternatively, the multiple internal combustion engines 40 may be packaged into a smaller area than a comparable single engine configured to power the mechanical loads 22.

Figure 3:
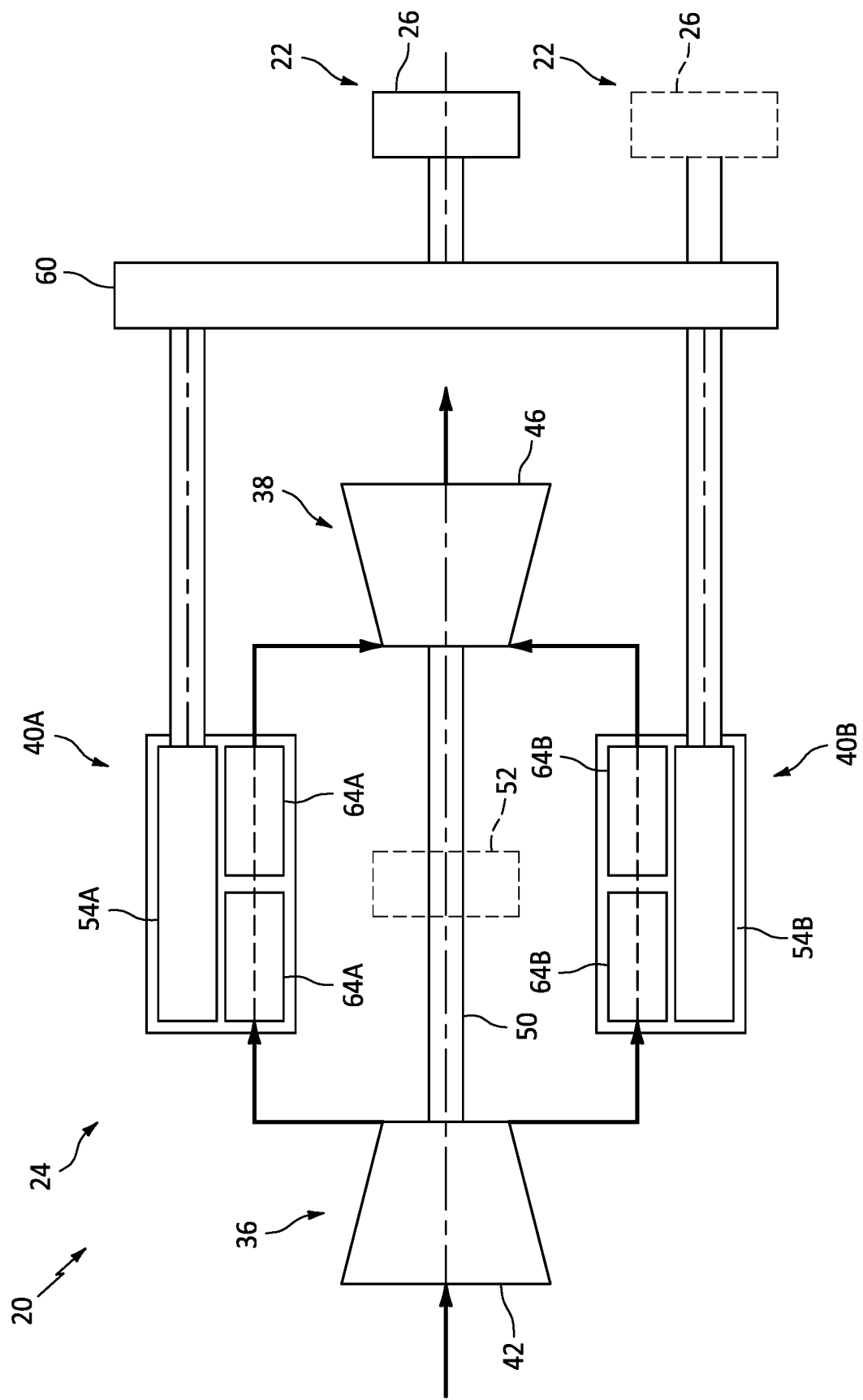
FIG. 3 is a schematic illustration of the aircraft system, where the engines power a common mechanical load.

In some embodiments, referring to FIG. 3, some or all of the internal combustion engines 40 may be configured to power a common (the same) mechanical load 22. Each of the rotating structures 54 of FIG. 3, for example, is coupled to the driven rotor 26 through the gearbox 60. Of course, in other embodiments, the internal combustion engines 40 may power multiple mechanical loads 22 through the gearbox 60. With the arrangement of FIG. 3, the internal combustion engines 40 provide redundancy for powering the mechanical load(s) 22. Furthermore, the internal combustion engines 40 may be operated at different power settings to tailor power to the mechanical load(s) 22. For example, during some modes of operation, the first engine 40A may be operated at a first setting (e.g., full power) and the second engine 40B may be operated at a second setting (e.g., low or medium power). Thus, at least one of the internal combustion engines 40 may be operated at a setting with a relatively high (e.g., maximum) efficiency. During other modes of operation, the internal combustion engines 40 may be operated at a common (the same) setting.

Figure 4A:
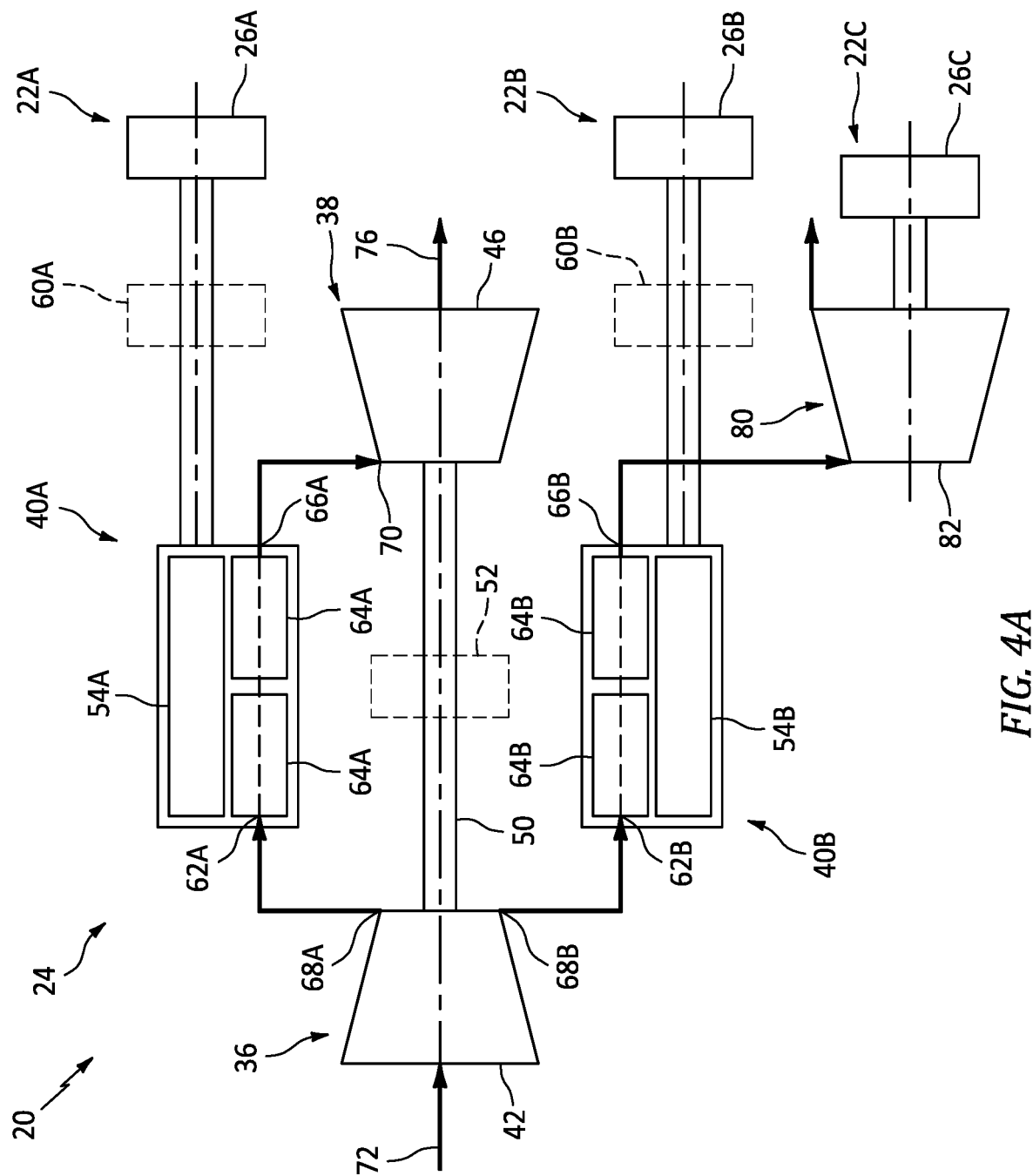
FIGS. 4A and 4B are schematic illustrations of the aircraft system with various arrangements for including an additional turbine section powering another mechanical load.
Figure 4B:
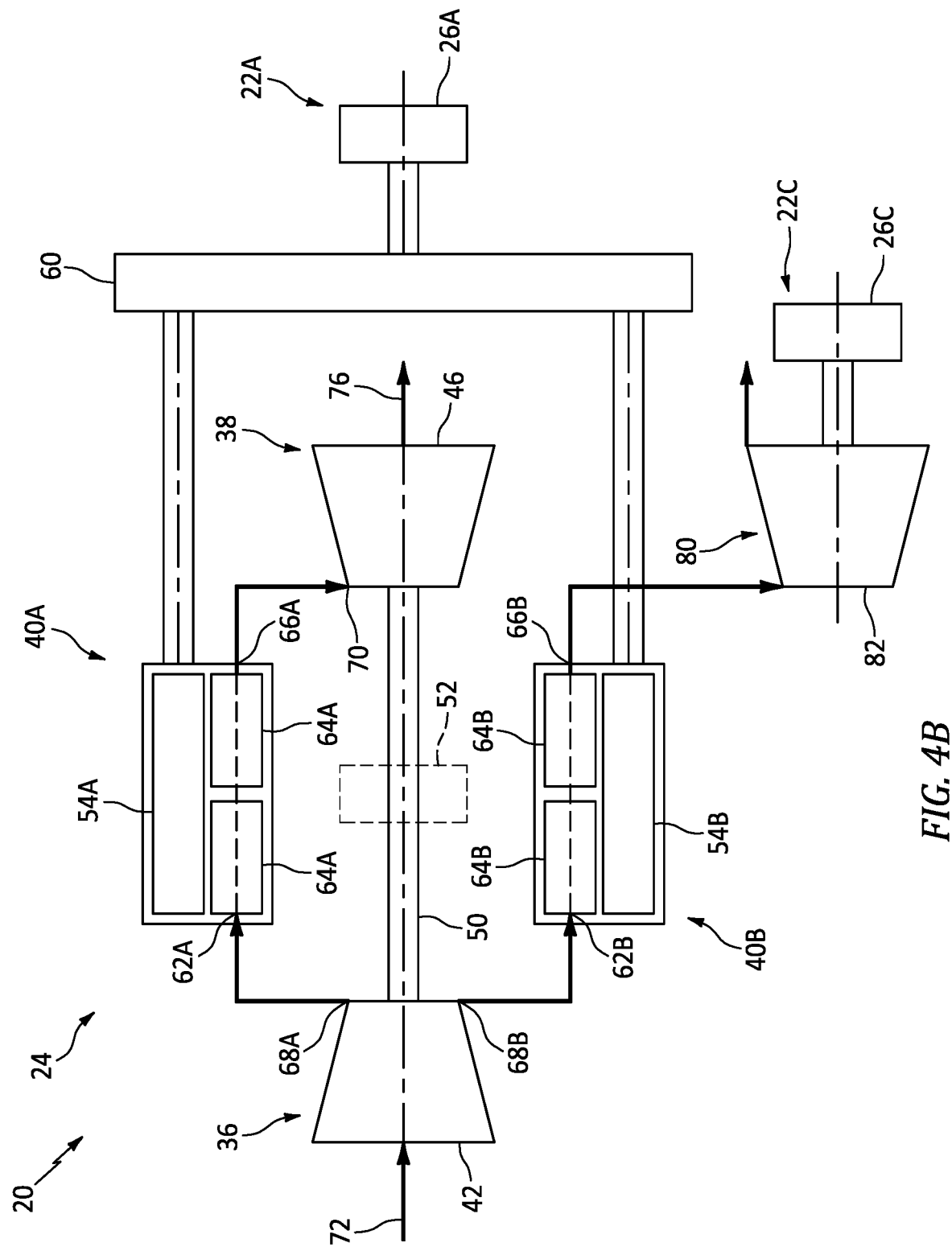

In some embodiments, referring to FIGS. 4A and 4B, at least one of the internal combustion engines 40 may be fluidly discrete (e.g., separate, decoupled) from the turbine section 38. For example, while each of the internal combustion engines 40 of FIGS. 4A and 4B may receive the compressed air from the compressor section 36, the turbine section 38 may receive the combustion products from the first engine 40A and not the combustion products from the second engine 40B. Rather, the combustion products from the second engine 40B may be directed through another turbine section 80 that is discrete from the turbine section 38. These combustion products may drive rotation of a bladed turbine rotor 82 within the turbine section 80, and rotation of the turbine rotor 82 may drive rotation of a rotor (e.g., 26C) of another mechanical load (e.g., 22C) that is coupled to the turbine rotor 82. The turbine rotor 82 includes a plurality of turbine blades arranged circumferentially around and connected to one or more rotor bases; e.g., rotor hub(s) or rotor disk(s). In other embodiments, however, the turbine section 80 may be omitted from the arrangement of FIG. 4A, 4B such that the combustion products exhausted from the second engine 40B are exhausted from the aircraft system 20 or provided to another one or more downstream system components.

Figure 5:
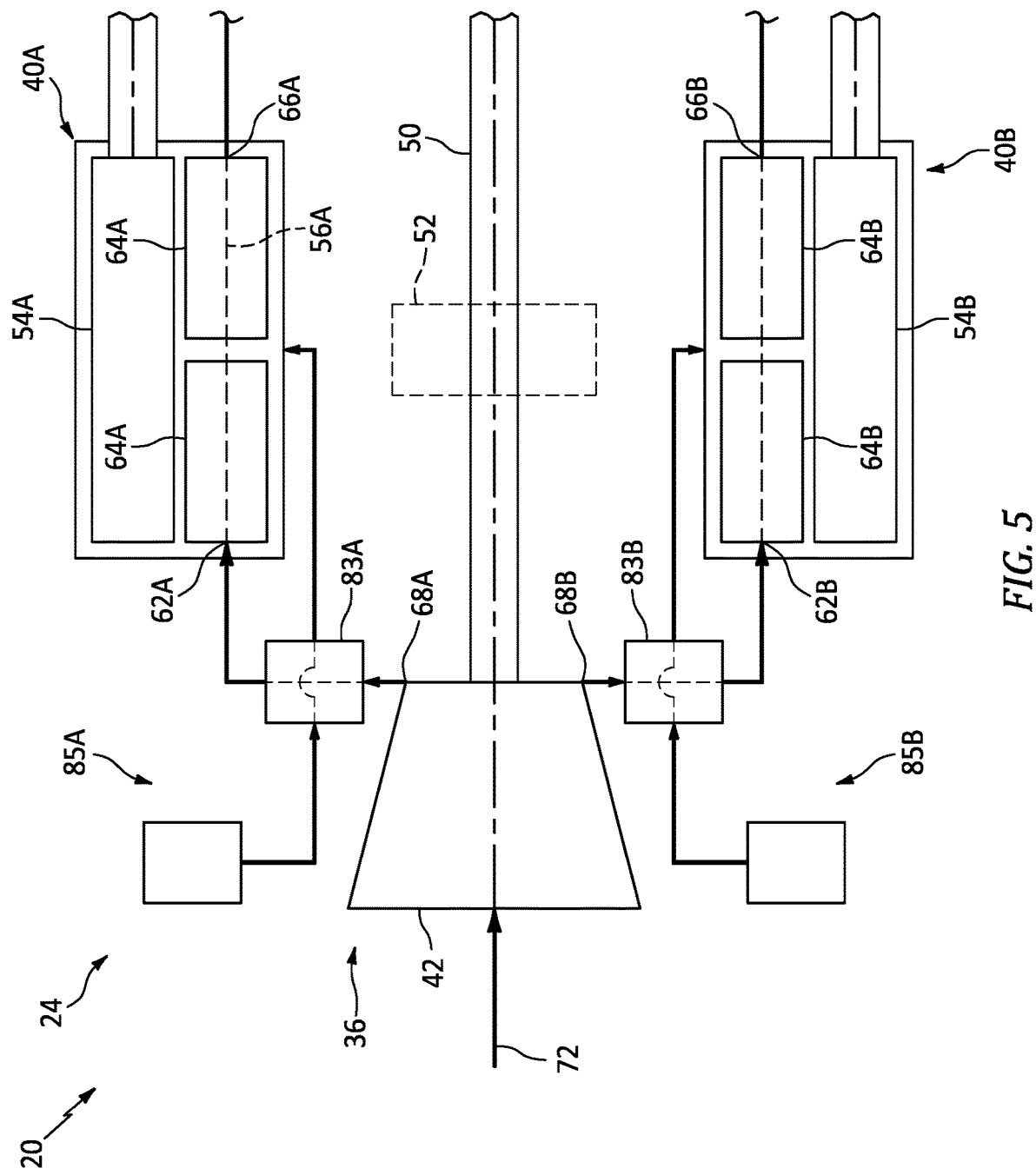
FIG. 5 is a partial schematic illustration of the aircraft system configured with one or more heat exchangers.

In some embodiment, referring to FIG. 5, the aircraft powerplant 24 may include one or more heat exchangers 83 (e.g., 83A and 83B) (e.g., intercoolers) for conditioning (e.g., cooling) the compressed air provided to the internal combustion engine(s) 40. Each heat exchanger 83 of FIG. 5, for example, is fluidly coupled with and between the compressor section 36 and a respective one of the engine inlets 62. Each heat exchanger 83 may also be arranged with a fluid system 85 (e.g., 85A, 85B) (e.g., a fuel system, a lubrication system and/or a heat exchange (e.g., cooling) system) for the aircraft powerplant 24 and its respective internal combustion engine 40. With such an arrangement, heat energy may be transferred out of the compressed air and into a heat exchange fluid (e.g., fuel or lubricant or coolant) to cool the compressed air before being directed into the respective internal combustion engine 40. This may increase internal combustion engine power and/or efficiency.

Figure 6:
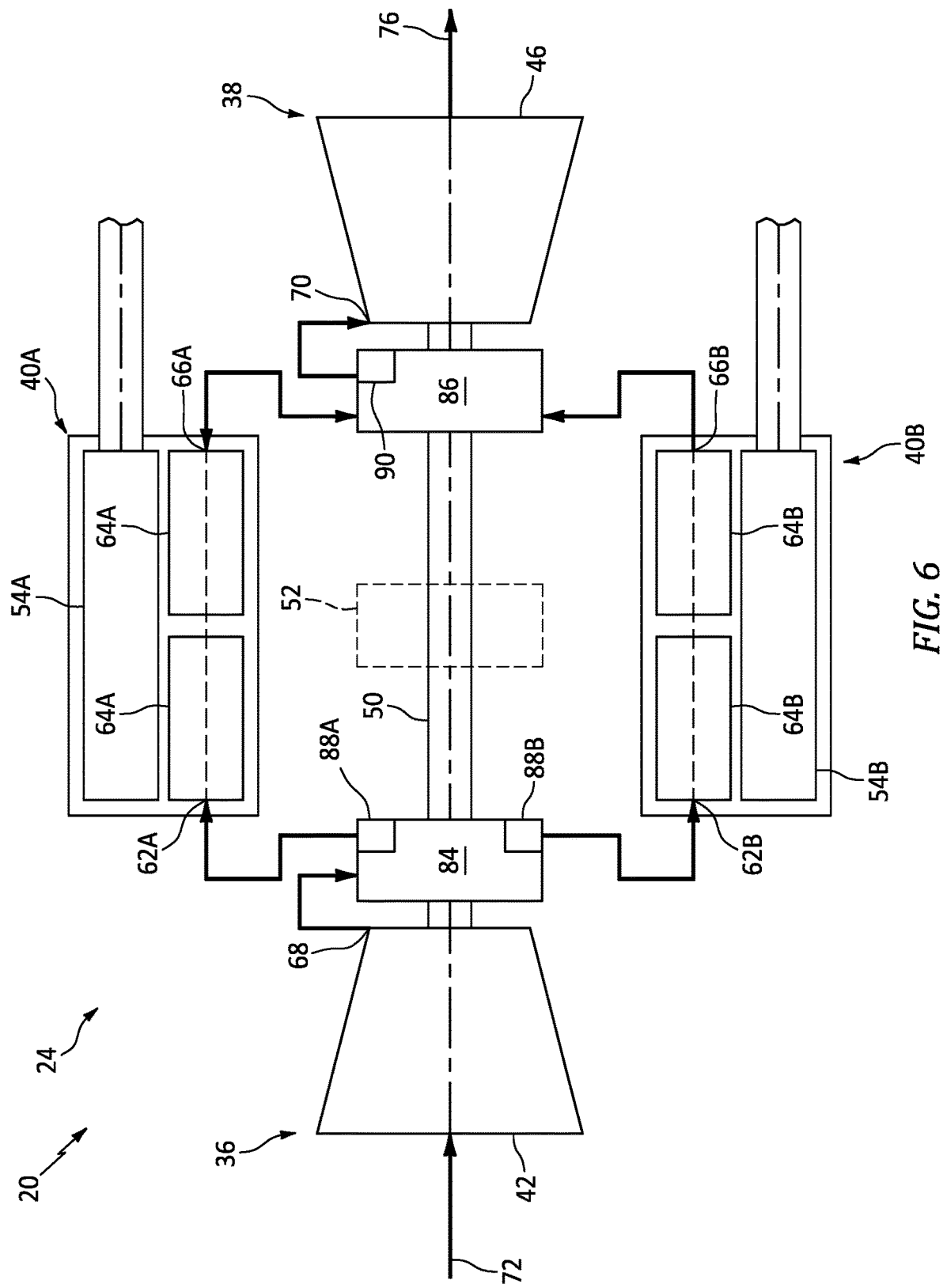
FIG. 6 is a partial schematic illustration of the aircraft system configured with one or more plenums.

In some embodiments, referring to FIG. 6, the aircraft powerplant 24 may include one or more plenums 84 and 86. The compressed air plenum 84 of FIG. 6 is fluidly coupled with and between the compressor section 36 and one or more of the internal combustion engines 40. This compressed air plenum 84 may provide an area to diffuse the compressed air to reduce internal turbulence. The compressed air plenum 84 may also include one or more regulators 88 (e.g., 88A and 88B) (e.g., metering orifices, valves, etc.) for respectively controlling flow of the compressed air to the internal combustion engine 40. The combustion products plenum 86 of FIG. 6 is fluidly coupled with and between one or more of the internal combustion engines 40 and the turbine section 38. This combustion products plenum 86 may provide an area to diffuse the combustion products to reduce internal turbulence. The combustion products plenum 86 may also include at least one regulator 90 (e.g., metering orifice(s), valve, etc.) for controlling flow of the combustion products to the turbine section 38. With such configurations, each plenum 84, 86 may mix, collect, combine, distribute and/or control the flow/pressure of fluid coming in/going out.

Figure 7A:
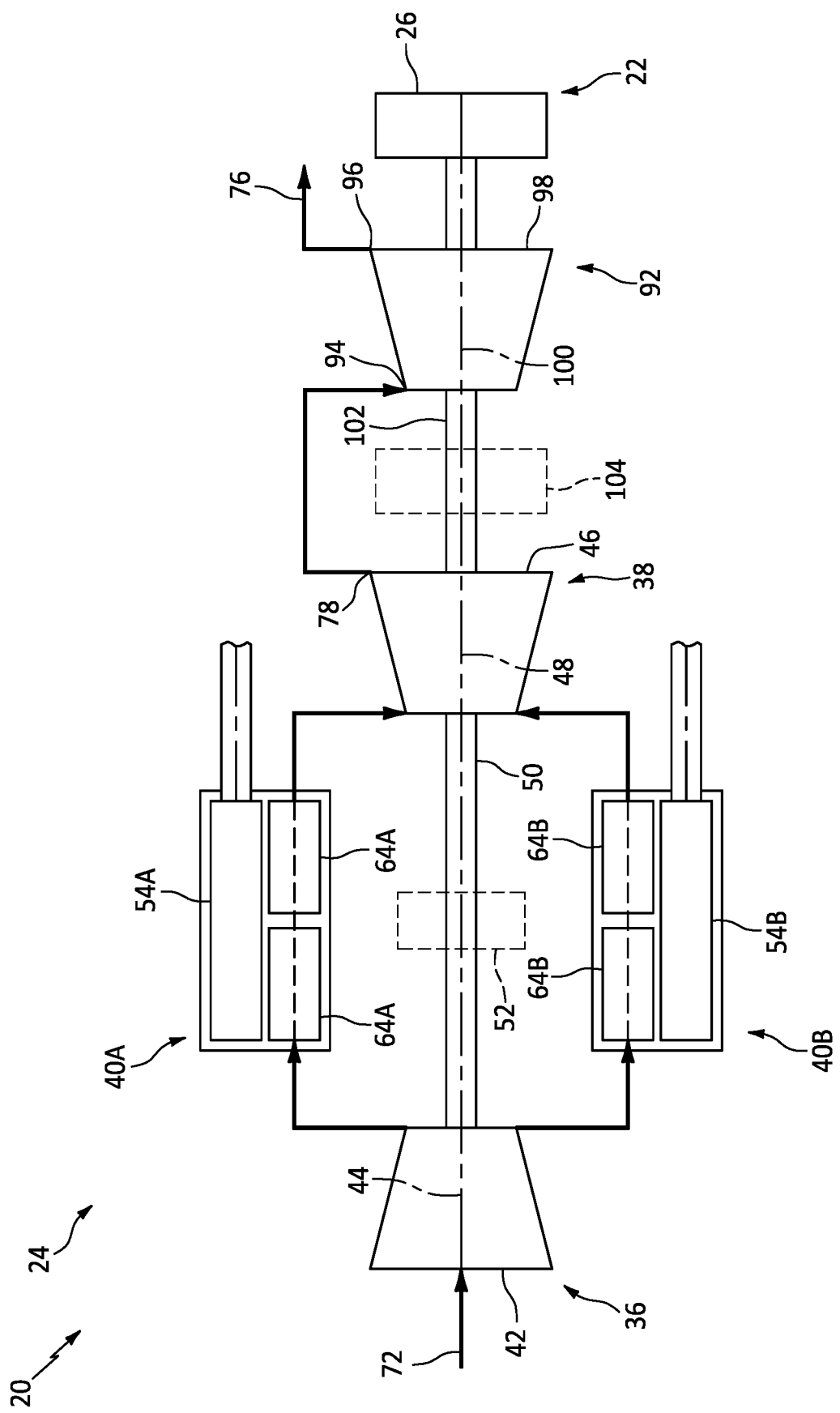
FIGS. 7A and 7B are partial schematic illustrations of the aircraft system with various arrangements for includes a turbine expander section powering another mechanical load.
Figure 7B:
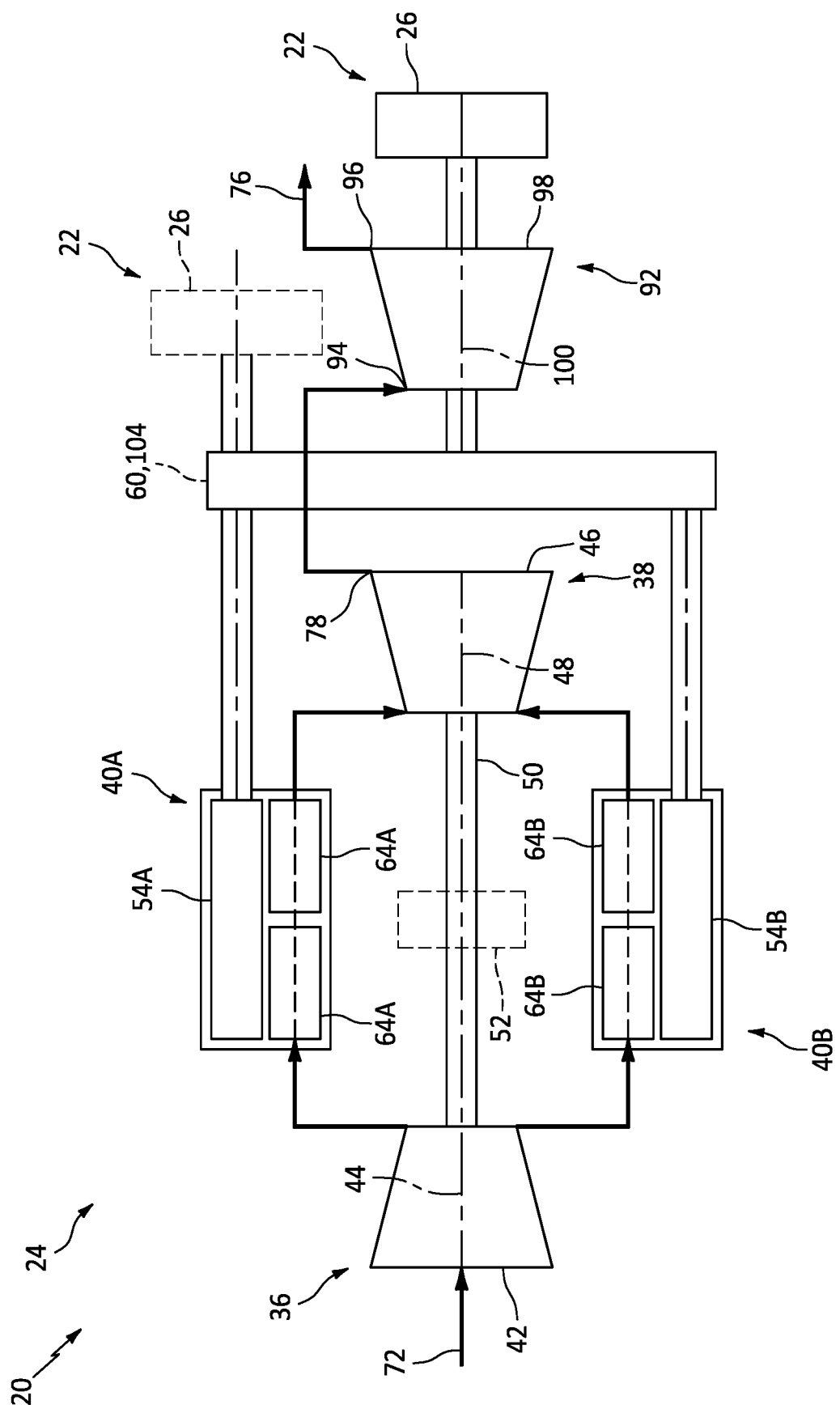

In some embodiments, referring to FIGS. 7A and 7B, the aircraft powerplant 24 may also include a turbine expander section 92; also sometimes referred to as a turboexpander section or a power turbine section. This turbine expander section 92 may be fluidly coupled with and between the turbine section 38 and the powerplant exhaust 76. An inlet 94 to the turbine expander section 92, for example, is fluidly coupled with and downstream of the turbine section outlet 78. An outlet 96 from the turbine expander section 92 may be the powerplant exhaust 76, or may be fluidly coupled with and upstream of the powerplant exhaust 76.

The turbine expander section 92 of FIG. 7A, 7B includes a bladed turbine expander rotor 98 rotatable about a turbine expander axis 100, which expander axis 100 may be parallel with (e.g., coaxial with) the compressor axis 44 and/or the turbine axis 48. This expander rotor 98 includes a plurality of turbine expander blades arranged circumferentially around and connected to one or more rotor bases; e.g., rotor hub(s) or rotor disk(s). The expander rotor 98 is coupled to and configured to drive rotation of a driven rotor 26 of an additional mechanical load 22.

In some embodiments, referring to FIG. 7A, the expander rotor 98 may also (or alternatively) be coupled to and configured to drive rotation of the compressor rotor 42. The expander rotor 98 of FIG. 7A, more particularly, is coupled to the compressor rotor 42 through the turbine rotor 46. The coupling between the expander rotor 98 and the turbine rotor 46 may be a direct drive connection (e.g., via a shaft 102) such that the expander rotor 98 and the turbine rotor 46 may rotate at a common (the same) speed. Alternatively, the coupling between the expander rotor 98 and the turbine rotor 46 may be a geared connection (e.g., via a gearbox 104) such that the expander rotor 98 and the turbine rotor 46 may rotate at different speeds.

In some embodiments, referring to FIG. 7B, the expander rotor 98 may be discrete from (e.g., not coupled to, not rotatable with, etc.) the turbine rotor 46 and the compressor rotor 42. Rather, the expander rotor 98 may be coupled to the driven rotor 26 and/or one or more of the rotating structures 54 through the gearbox 60, 104.

Any one or more or all of the gearboxes (e.g., 52, 60, 104) may be configured as a constant speed transmission. With such a configuration, a ratio between an input speed into the gearbox and an output speed form the gearbox remains constant. However, any one or more or all of the gearboxes (e.g., 52, 60, 104) may alternatively be configured as a variable speed transmission. With such a configuration, a ratio between an input speed into the gearbox and an output speed from the gearbox may change; e.g., selectively go up or down. An example of the variable speed transmission is a continuously variable transmission (CVT).

The aircraft powerplant 24 is described above as powering various different mechanical loads 22. However, it is contemplated some or all of these mechanical loads 22 may be combined into a single mechanical load. With such an arrangement, the aircraft powerplant 24 provides various different sources of power for the common mechanical load 22.

The system 20 is described herein with respect to an aircraft. The system 20 of the present disclosure, however, is not limited to aircraft applications. The system 20, for example, may also be used as, in or otherwise for a powerplant of a ground vehicle or a marine vehicle.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system, comprising:
a compressor section comprising a compressor rotor;
a turbine section comprising a turbine rotor configured to drive rotation of the compressor rotor;
a first engine including a first engine inlet, a first engine outlet and a first engine combustion zone fluidly coupled with and between the first engine inlet and the first engine outlet, the first engine inlet fluidly coupled with and downstream of the compressor section, and the first engine outlet fluidly coupled with and upstream of the turbine section; and
a second engine including a second engine inlet, a second engine outlet and a second engine combustion zone fluidly coupled with and between the second engine inlet and the second engine outlet, the second engine inlet fluidly coupled with and downstream of the compressor section;
wherein at least one of the first engine or the second engine comprises a reciprocating piston engine or a continuous combustion engine.

2. The system of claim 1, wherein the compressor section is fluidly coupled with the first engine inlet and the second engine inlet in parallel.

3. The system of claim 1, wherein the turbine section is fluidly coupled with the first engine outlet and the second engine outlet in parallel.

4. The system of claim 1, further comprising:
a turbine expander section; and
an inlet to the turbine expander section fluidly coupled with and downstream of an outlet from the turbine section.

5. The system of claim 4, further comprising a mechanical load rotatably driven by a rotor of the turbine expander section.

6. The system of claim 4, further comprising:
a geartrain; and
a rotor of the turbine expander section coupled to the turbine rotor through the geartrain.

7. The system of claim 4, further comprising:
a geartrain; and
a rotor of the turbine expander section coupled to a first engine rotating structure of the first engine through the geartrain.

8. The system of claim 7, wherein the rotor of the turbine expander section is further coupled to a second engine rotating structure of the second engine through the geartrain.

9. The system of claim 1, wherein the second engine outlet is fluidly coupled with and upstream of the turbine section.

10. The system of claim 1, wherein the second engine outlet is fluidly discrete from the turbine section.

11. The system of claim 1, further comprising a plenum fluidly coupled with and between the compressor section and the first engine inlet.

12. The system of claim 1, further comprising a plenum fluidly coupled with and between the first engine outlet and the turbine section.

13. The system of claim 1, further comprising a heat exchanger fluidly coupled with and between the compressor section and the first engine inlet.

14. The system of claim 1, wherein the first engine comprises the reciprocating piston engine.

15. The system of claim 1, wherein the first engine comprises the continuous combustion engine.

16. The system of claim 1, further comprising:
a mechanical load; and
a rotating structure of the first engine configured to drive rotation of the mechanical load.

17. The system of claim 1, further comprising:
a propulsor rotor; and
a powerplant configured to drive rotation of the propulsor rotor, the powerplant comprising the compressor section, the turbine section, the first engine and the second engine.

18. The system of claim 1, further comprising:
an electric generator; and
a powerplant configured to drive rotation of a rotor of the electric generator, the powerplant comprising the compressor section, the turbine section, the first engine and the second engine.

19. A system, comprising:
a compressor section comprising a compressor rotor;
a turbine section comprising a turbine rotor configured to drive rotation of the compressor rotor;
a first engine including a first engine inlet, a first engine outlet and a first engine combustion zone fluidly coupled with and between the first engine inlet and the first engine outlet, the first engine inlet fluidly coupled with and downstream of the compressor section, and the first engine outlet fluidly coupled with and upstream of the turbine section; and
a second engine including a second engine inlet, a second engine outlet and a second engine combustion zone fluidly coupled with and between the second engine inlet and the second engine outlet, the second engine outlet fluidly coupled with and upstream of the turbine section;
wherein at least one of the first engine or the second engine comprises a reciprocating piston engine or a continuous combustion engine.

20. A system, comprising:
a turbocharger comprising a compressor section and a turbine section;
a first engine configured to receive first engine compressed air from the compressor section, combust first engine fuel with the first engine compressed air to generated first engine combustion products, and direct the first engine combustion products to the turbine section to drive rotation of a rotor within the turbine section; and
a second engine configured to receive second engine compressed air from the compressor section, combust second engine fuel with the second engine compressed air to generated second engine combustion products, and direct the second engine combustion products to the turbine section to further drive rotation of the rotor within the turbine section:,
wherein at least one of the first engine or the second engine comprises a reciprocating piston engine or a continuous combustion engine.

\* \* \* \* \*